United States Patent [19]

Holman

[11] 4,392,563
[45] Jul. 12, 1983

[54] BRAKE MECHANISM FOR MATERIAL HANDLING SYSTEM

[76] Inventor: Lee Holman, 505 Cuesta Dr., Aptos, Calif. 95003

[21] Appl. No.: 321,182

[22] Filed: Nov. 16, 1981

Related U.S. Application Data

[63] Continuation of Ser. No. 136,178, Mar. 31, 1980, abandoned.

[51] Int. Cl.³ .............................................. B65G 11/00
[52] U.S. Cl. ........................................ 193/10; 366/68
[58] Field of Search .................. 193/10, 22, 23, 16; 366/68; 188/72.4

[56] References Cited

U.S. PATENT DOCUMENTS

| | | | |
|---|---|---|---|
| 2,713,929 | 7/1955 | Castendyck | 193/10 |
| 3,279,766 | 10/1966 | Mendoza | 366/68 |
| 4,042,072 | 8/1977 | Baba | 188/72.4 |

Primary Examiner—John J. Love
Assistant Examiner—Gene A. Church
Attorney, Agent, or Firm—Gerald L. Moore

[57] ABSTRACT

A brake primarily for use with a cement dispensing system such as those attached to the rear of a cement truck. A dispensing chute receives material from the tube connecting with the drum and is mounted to swing through an arc for carrying the cement away from the truck. The brake comprises an annular flange mounted concentric with the dispensing tube and a cooperating brake having shoes for gripping the flange. By fixing the flange to either the tube or the chute and the brake to the other member, actuation of the brake will stop and hold the chute in a selected radial position. The brake functions better than prior art devices because the flange in being positioned around the tube, provides a substantial lever arm for allowing the brake to stop and hold the chute.

1 Claim, 4 Drawing Figures

BRAKE MECHANISM FOR MATERIAL HANDLING SYSTEM

This is a continuation of application Ser. No. 06/136,178, filed Mar. 31, 1980, now abandoned.

BACKGROUND OF THE INVENTION

On cement trucks or other materal handling systems, there is frequently used a chute of variable length which can be swung radially through approximately 180° to receive cement at one end and carry it to a remote location such as a form or other conveyance. For instance on cement trucks the chute is mounted to rotate about the axis of a funnel receiving cement from the drum and is slanted downward to carry this cement to positions remote from the truck. When the chute is positioned radially to dispense the cement at a selected location, a brake is actuated to stop further rotation of the chute and hold it at that position.

In the past this brake has functioned to apply a braking force on the support for the hydraulic cylinder which raises and lowers the chute. The chute extends out from the truck as much as ten feet or more and can hold as much as two to three hundred pounds of cement. Thus when the chute is shifted radially while full of cement there is a substantial moment to be counteracted in stopping the chute. Naturally the swinging chute can cause damage if not closely controlled. This brake, because of its location, has been subject to failure and has been relatively ineffective in controlling chute positions. In the first place the position of the brake beneath the pipe has permitted cement and other materials to drop on the mechanism thereby frequently resulting in failure or ineffective operation. Additionally because the brake acts on such a small radius shoe, the braking moment in comparison to that resulting from the weight acting on the radius of the cement-filled chute has caused repeated failures. It is the purpose of the present invention to provide an improved braking system for a material dispensing apparatus such as the dispensing chute for a cement truck.

SUMMARY OF THE INVENTION

A brake for locking a dispensing chute in a selected position wherein the chute is positioned to receive material into one end from a dispensing funnel and dispense it out the other end which is rotatable about the axis of said funnel. The brake comprises an annular flange positioned around the outside of the funnel and a brake having shoes acting on said flange. By fixing the brake to either the funnel or the chute and the flange to the other member, the chute can be stopped and held in a selected radial position.

DESCRIPTION OF THE INVENTION

Figure 1:
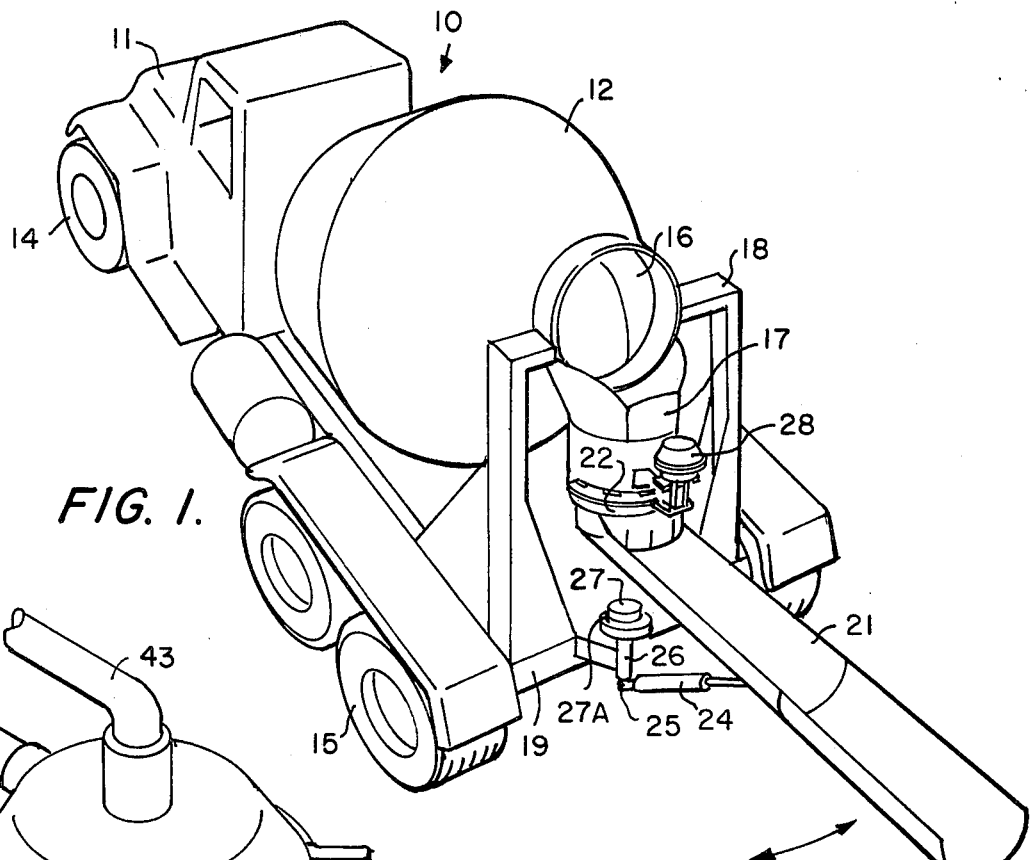
FIG. 1 is a rear perspective view of a standard cement truck incorporating the present invention.
Figure 2:
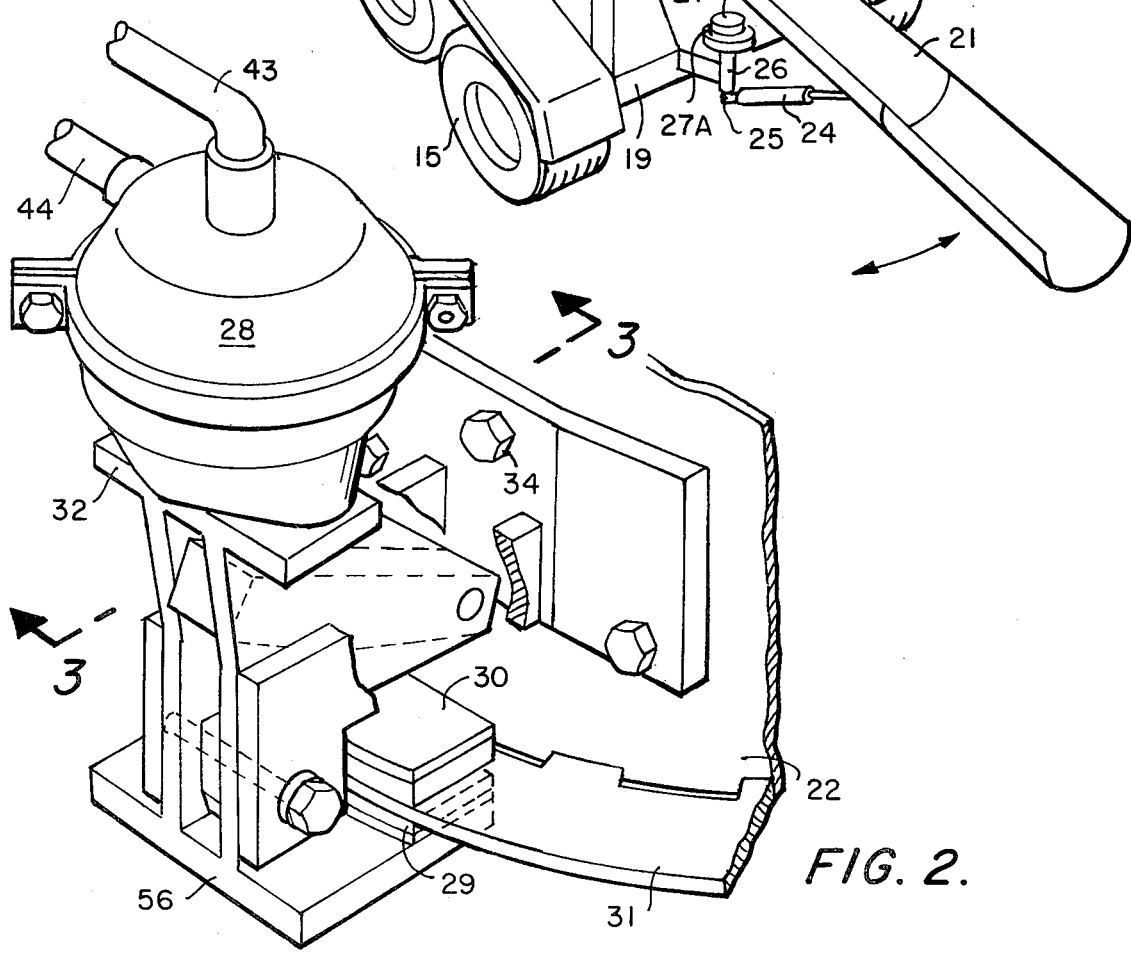
FIG. 2 is an enlarged view of the brake mechanism and a portion of the flange.

In FIG. 1 is shown one application of the present invention embodied in a cement truck 10 having a cab 11 and a cement drum 12. The vehicle is mounted on the forward wheels 14 and rear tandem wheels 15. Positioned at the rear of the drum 12 is an access hole 16 through which cement making material can be added to the drum and from which the mixed cement pours into a funnel dispenser 17. Such pouring is effected by raising the forward end of the drum 12 by a lifting mechanism not shown in the drawings but well-known.

The rear of the drum 12 and the funnel 17 are supported on a frame 18 extending vertically from a chassis 19 of the vehicle. Beneath the funnel 17 is supported a chute dispenser 21 positioned beneath the funnel and being pivotally attached to a collar 22. The collar will rotate about the funnel to allow the chute to be pivoted about the funnel vertical axis to any of a multitude of radial positions generally extending through appoximately 180° from the rear of the truck.

Supporting the extending or second end of the chute 21 is a hydraulic cylinder mechanism 24 (FIG. 1) which is fixed at the lower end to a vertically extending shaft 25 projecting upward through a sleeve 26 welded to the frame 18. Fixed to the top of this shaft is a brake mechanism 27 which acts on a collar 27A fixed to the top of the sleeve and through which the vertical shaft projects. The brake mechanism preferably is hydraulically actuated and controlled by a switch or control positioned on the rear of the truck and in the cab of the truck (neither shown). By actuation of one of the switches the brake is actuated to contact the collar for stopping rotation of the shaft 25 to hold the chute in a selected stationary position extending radially outward from the funnel. Thus cement poured from the drum 12 and through the funnel 17 falls into the chute 21 for dispensing to any of a multitude of positions within a fan-shaped area extending through approximately 180° of the funnel and to the rear of the truck.

The chute, when filled with cement, weighs between two and three hundred pounds and if the truck does not set quite level or the chute is caused to pivot too quickly it can swing into objects or the frame of the truck and cause damage. When the brake just described is actuated to stop the moving chute it has been found that the heavy weight due to the cement in the chute results in a substantial torque or moment being impressed on the shaft 25. As a result application of the brake 27 to lock or stop rotation of the collar frequently results in the collar 27A or sleeve 26 being torn loose from the truck frame. Additionally because the brake mechanism and collar are positioned beneath the funnel 17 and are centered on the axis of rotation of the chute, cement drops onto it and tends to cause malfunctions of the brake. It is the purpose of the present invention to provide an improved brake for use on a dispensing mechanism such as the cement truck described.

Accordingly as shown in the figures, a brake 28 is provided having a stationary shoe 29 and a movable shoe 30 which acts to stop rotation of the flange 31 when the brake is activated. In the present embodiment the brake mechanism is mounted on a support 31 which is bolted to the side of the funnel 17 by bolts 32. The flange 31 is welded to the collar 22 fitting around the bottom of the funnel and to which the chute 21 is attached. By activation of the brake, the shoes 29 and 30 can be caused to grip the flange 31 to stop any radial movement and hold the chute in a stationary position. Because the flange 31 is of a substantial diameter thereby providing a significant lever arm for the braking force and because the brake mechanism and flange are positioned above the funnel 17, the brake and flange mechanism remain relatively free of cement and other foreign material which otherwise has caused malfunctioning of the previously used brake mechanism 27.

Figure 3:
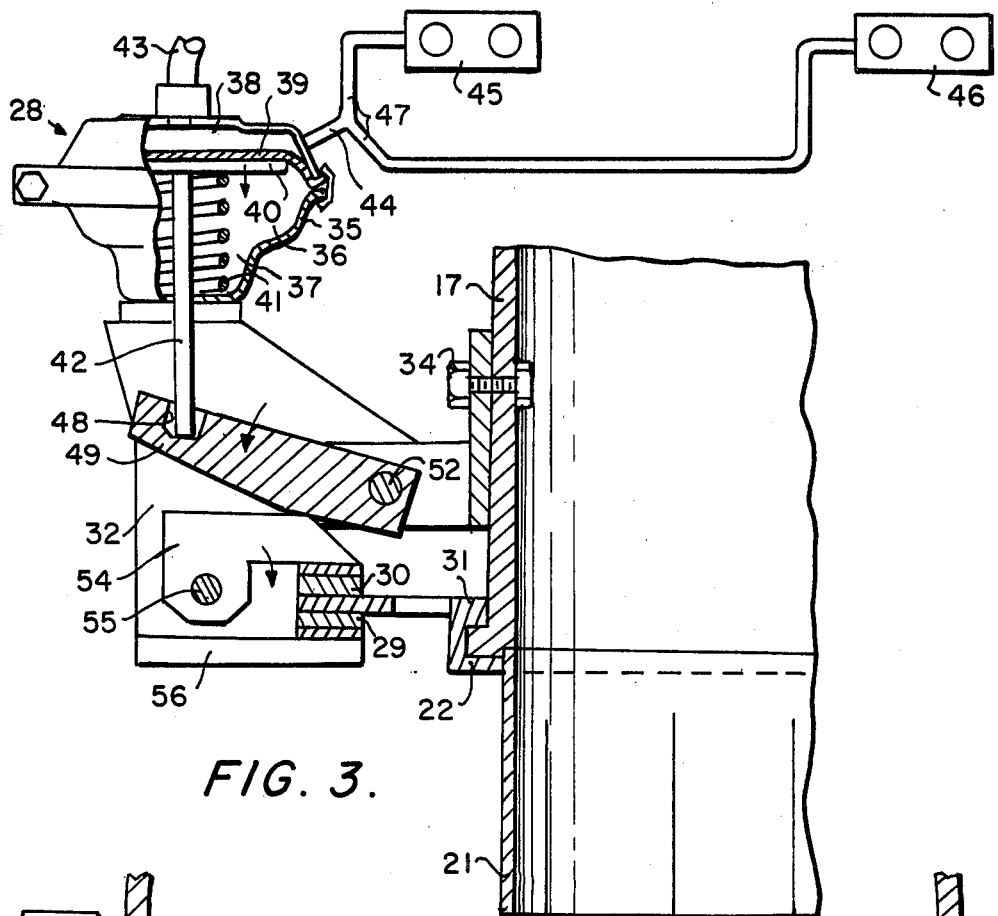
FIG. 3 is a cross-sectional view along the line 3—3 of FIG. 2.
Figure 4:
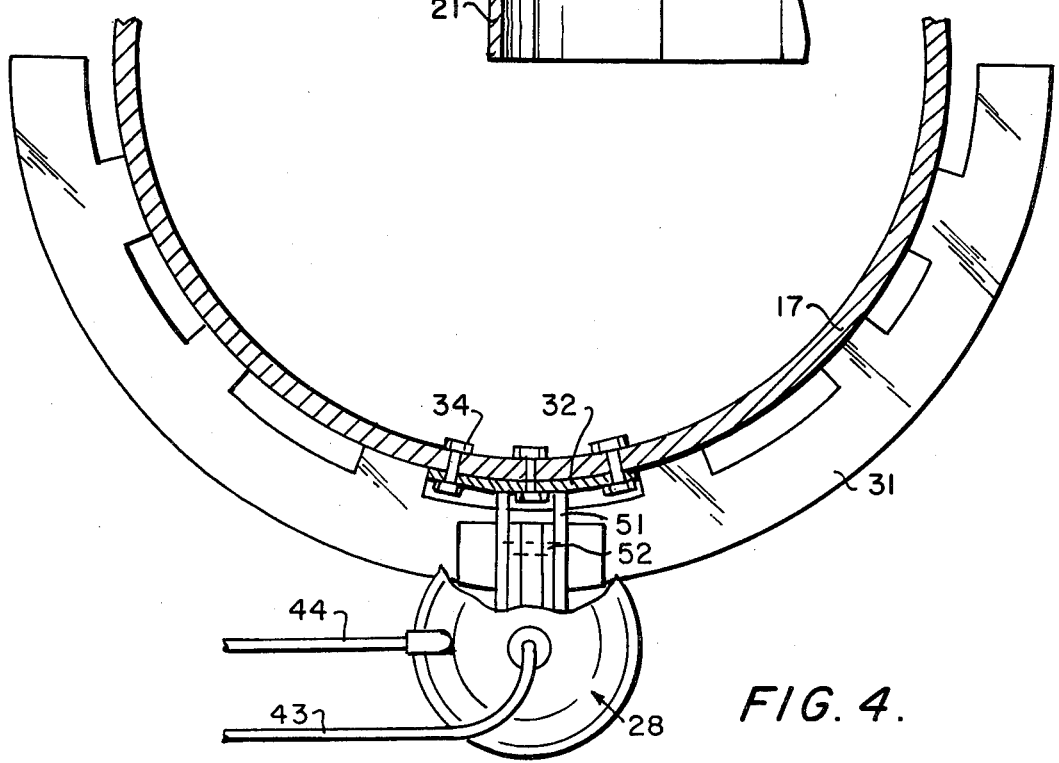
FIG. 4 is a top view of the brake mechanism and flange.

The brake mechanism 28 is shown in detail primarily in FIG. 3 and comprises a housing 35 forming an internal chamber 36 which is divided into a piston chamber 37 and a pressure air chamber 38 held by a flexible diaphragm 39. A piston 40 positioned in the piston chamber is spring-biased by a spring 41 into contact with the diaphragm and is attached to an actuating shaft 42. By causing the flow of pressure air into the inlet pipe 44 by activation of one of the pressure controls 45 or 46 positioned in the proximity of the brake mechanism and in the cab of the vehicle, respectively. Pressure air is caused to flow through the pipe 47 from a pressure air source (not shown) and into the pressure chamber 38 to force the diaphragm and the piston 40 downward against the force of the spring 41. Subsequent actuation of one of the controls 45 or 46 shuts off the flow of pressure air allowing air within the chamber 38 to exit through the outlet 43. The piston thereafter returns back to the position shown under the force of the spring 41 and the force on the shoe 30 is relieved. The air connections for the brake mechanism are not shown but are of standard design. One type of brake suitable for the purpose shown is a Type 16 having a 2¼" stroke and manufactured by the Bendix Heavy Vehicles System Group.

The exposed end of the shaft 42 is positioned in a recess 48 of a lever 49 pivotally supported between the horizontally extending arms 50 and 51 of the support 32 by a pin 52. Movement of the shaft 42 downward forces this lever into contact with a brake shoe support 54 which is pivotally attached to the support 32 by a pin 55 and in turn supports the movable brake shoe 30. The stationary shoe 29 is fixed to a flange 56 welded to the bottom of the support 32.

With downward movement of the shaft 42 into engagement with the lever 49, the lever 54 is forced to rotate about the pin 55 to cause the shoes 30 to bear against the flange 22 and squeeze it against the shoe 29 to prevent or stop rotation of the collar 22. Upon release of air pressure in the brake 38, the shaft 42 returns upward with the piston 40 under force of the spring 41 allowing the lever 49 and the shoe support 54 and the shoe 30 to ride freely on the flange 22. These parts will not present any significant force sufficient to slow rotation of the collar 22. If necessary a spring can be located to return the movable shoe 30 upward out of engagement with the flange, however in the application of the invention to the cement truck, such return spring is unnecessary.

Thus there is provided a brake which acts on a lever arm of significant length to render effective braking of any radial movement of the chute. The brake is positioned above the outlet of the funnel so as to remain in a relatively dirt-free environment and is sturdily constructed to withstand the substantial forces of the chute even when the chute is filled with cement.

The invention claimed:

1. An unloading system for a cement carrying truck wherein cement is carried in a drum and emptied therefrom through a rear opening, said unloading system comprising:
    a dispensing funnel supported on said trunk and comprising a vertically extending cylindrical section positioned to receive and transport cement from said drum rear opening;
    an elongated chute for carrying cement from said funnel;
    means supporting one end of said chute in a position to receive cement from said funnel with the chute being rotatable in a generally horizontal plane about the cylindrical section of said funnel and to the rear of said truck; and
    energizeable brake means for locking said chute in any of said positions about said funnel cylindrical section comprising;
    a flange fixed to said chute and extending partially around and normal to said funnel cylindrical section to move around said funnel with said chute as it is rotated; and
    brake mechanism fixed to said funnel and including clamping means to squeeze said flange when said brake mechanism is energized thereby stopping and holding said chute in any selected horizontal position to which it is rotated.

* * * * *